US012679644B2

(12) United States Patent
Puntigam et al.

(10) Patent No.: US 12,679,644 B2
(45) Date of Patent: Jul. 14, 2026

(54) STORAGE SYSTEM AND METHOD FOR STORING OBJECTS IN SUCH A STORAGE SYSTEM

(71) Applicant: Knapp AG, Hart bei Graz (AT)

(72) Inventors: Wolfgang Puntigam, Hart bei Graz (AT); Franz Mathi, Hart bei Graz (AT); Bernhard Gütl, Hart bei Graz (AT); Wilfried Waukmann, Hart bei Graz (AT)

(73) Assignee: Knapp AG, Hart bei Graz (AT)

( * ) Notice: Subject to any disclaimer, the term of this patent is extended or adjusted under 35 U.S.C. 154(b) by 141 days.

(21) Appl. No.: 18/855,605

(22) PCT Filed: Jan. 31, 2023

(86) PCT No.: PCT/AT2023/060020
§ 371 (c)(1),
(2) Date: Oct. 9, 2024

(87) PCT Pub. No.: WO2023/197018
PCT Pub. Date: Oct. 19, 2023

(65) Prior Publication Data
US 2025/0229988 A1      Jul. 17, 2025

(30) Foreign Application Priority Data

Apr. 13, 2022     (AT) .............................. A 50241/2022

(51) Int. Cl.
B65G 1/04          (2006.01)
B65G 1/14          (2006.01)
(52) U.S. Cl.
CPC ............. B65G 1/0464 (2013.01); B65G 1/14 (2013.01)

(58) Field of Classification Search
CPC ................................ B65G 1/0464; B65G 1/14
See application file for complete search history.

(56) References Cited

U.S. PATENT DOCUMENTS

| | | | |
|---|---|---|---|
| 12,595,158 B2 * | 4/2026 | Mayadeen | ........... B65G 1/0464 |
| 2017/0217684 A1 | 8/2017 | Swoboda | |

FOREIGN PATENT DOCUMENTS

| | | |
|---|---|---|
| DE | 3106137 A1 | 9/1982 |
| EP | 0602399 A1 | 6/1994 |

(Continued)

OTHER PUBLICATIONS

International Search Report, mailed mailed Apr. 18, 2023, from PCT International App. No. PCT/AT2023/060020.

(Continued)

*Primary Examiner* — James Keenan
(74) *Attorney, Agent, or Firm* — Workman Nydegger

(57) ABSTRACT
A storage system including at least one shelf having shelf supports, at least one storage operating vehicle, at least two storage aids, and an operating level and a storage volume arranged below the operating level. The storage operating vehicle is arranged such that it can move in the operating level and is configured to introduce the storage aids into the storage volume and to retrieve them. Each of the storage aids has engagement means, and the shelf supports have receiving means. The engagement means may be moved between a locking state, in which the engagement means are substantially fixed in at least some of the receiving means and hold the respective storage aid in a storage position and a release state, in which the engagement means are released from the receiving means. The storage operating vehicle is configured to move the engagement means between the locking and release states.

11 Claims, 5 Drawing Sheets

(56) References Cited

FOREIGN PATENT DOCUMENTS

| EP | 2138427 | A1 | 12/2009 |
| EP | 2982624 | A1 | 2/2016 |
| GB | 2598937 | A | 3/2022 |
| JP | H05201544 | A | 8/1993 |
| JP | 2011148613 | A | 8/2011 |

OTHER PUBLICATIONS

International Preliminary Report on Patentability, mailed Jul. 17, 2024, from PCT International Application No. PCT/AT2023/060020, 19 pages.

* cited by examiner

STORAGE SYSTEM AND METHOD FOR STORING OBJECTS IN SUCH A STORAGE SYSTEM

BACKGROUND

The invention relates to a storage system according to the preamble of claim 1, and a method for storing objects in such a storage system using the steps according to claim 8.

In the technical field of warehouse logistics or storage logistics, respectively, automated storage systems have been known, in which a wide variety of objects may be stored. Such automated storage systems enable at least partially automated storage and retrieval of objects in a storage volume of the storage system according to storage and retrieval orders.

In automated storage systems there are usually used storage operating vehicles, which are also called storage and retrieval devices, level operating devices or shuttles depending on the application. Objects to be stored are sometimes brought into the storage volume directly or with the help of storage aids. However, since the travel paths of the shuttles or shelf operating devices take up a lot of space, the use of the available space in a storage system is not optimal. Furthermore, each storage location in storage systems according to the state of the art usually has a fixed volume, which is independent of the volume of the stored object. Small objects are usually stored in large quantities in individual containers in order to store a large number of objects in a common storage location in this way. For this purpose, containers have been known in prior art, in which several identical objects are stored, such as containers with subdivisions to generate individual slots for different objects or mixed containers, in which different objects are being stored. However, this complicates storage logistics and leads to delays in the handling of the objects by the storage system, as these objects may only be stored and retrieved together.

Furthermore, so-called automated grid storage systems have been known, which achieve a higher volume utilization by avoiding aisles for the storage operating vehicles. Here, a grid is provided by horizontal longitudinal and transverse rails. The grid is supported by vertical supports at the intersection points of the longitudinal and transverse rails. Two longitudinal rails and two transverse rails, as well as the shelf supports, create a vertical storage shaft, in which containers stacked on top of each other are provided for storing the items. The topmost container in the stack may be accessed using orthogonally movable robots, or this container may be relocated or retrieved from the grid storage using the robot. Here, too, the volume of a storage location is defined by the volume of each of the containers. If only a small article is stored in a container, the volume of the container provided to receive the article is again not optimally utilized and dead space is created. Another disadvantage has proven to be that the entire load of a container stack rests on the container at the bottom. The containers must therefore be statically dimensioned in such a way that they can withstand this high load. Containers having such dimensions are expensive to manufacture. It should also be noted that containers stored close together and on top of each other have a negative effect in the event of a fire, as extinguishing measures cannot effectively reach the source of the fire.

BRIEF SUMMARY

The aim of the invention is to eliminate the above-mentioned disadvantages of the prior art and to provide a cost-effective storage system and method for storing objects, which enables the storage of objects with efficient use of space.

This is solved by providing a storage system with the features of claim 1 and a method for storing objects with the features of claim 8.

The storage system according to the invention comprises at least one shelf having several shelf supports that extend essentially vertically and are set up on a base. Furthermore, the storage system also comprises at least one storage operating vehicle and at least two storage aids, as well as an operating level arranged at an upper end of the shelf and a storage volume arranged below the operating level. The storage operating vehicle is arranged such that it can move in the operating level and is configured to introduce the storage aids into the storage volume and to retrieve them from it.

Each of the storage aids has engagement means, and the shelf supports have receiving means arranged in the storage volume. The engagement means may be moved between a locking state, in which the engagement means are essentially fixed in at least some of the receiving means and hold the respective storage aid in a storage position in the storage volume, and a release state, in which the engagement means are released from the receiving means. The storage operating vehicle is configured to move the engagement means between the locking state and the release state, starting from the operating level. Furthermore, by moving the engagement means between the release state and the locking state, the storage aid may be positioned or fixed in different storage positions within the storage volume, whereby a distance between two storage aids that follow one another vertically in a shelf may be adapted to the space requirements of the respective object stored on the storage aid. This will significantly improve the use of space within the storage system.

The storage operating vehicle preferably comprises a load-receiving means, which may be moved essentially vertically in the storage volume and may be coupled to one of the storage aids for introducing and retrieving the storage aid from the storage volume. This provides the advantage that the storage operating vehicle itself need not be introduced into the storage volume in order to fix a storage aid in a storage position or to release it from this.

According to a preferred embodiment of the storage system according to the invention, the load-receiving means is configured to move the engagement means, preferably in the course of the coupling with the storage aid, from the locking state into the release state and/or preferably in the course of the decoupling from the storage aid from the release state into the locking state. This achieves the advantage that no separate means is required to move the engagement means between the locking state and the release state, and the fixing or releasing, respectively, of the storage aid in or from the storage position takes place at the same time as the connection or release from the load-receiving means.

The receiving means are preferably configured as recesses, depressions or seams provided in the shelf supports. This has the advantage that the receiving means are simple and inexpensive to manufacture.

The engagement means are preferably configured as hooks, bolts or segment discs arranged on a shaft. In addition, they are preferably pretensioned by means of a spring in the locking state and/or the release state. This has the advantage that a shift between the locking state and the release state is possible with a simple movement. In addition, a pre-tension in the release state may prevent the engagement means from being accidentally locked or a pre-tension in the locking state may prevent the engagement means from being accidentally released. Preferably, the engagement means of one of the storage aids in the locking state engage with receiving means of several shelf supports that are opposite one another in a level.

The storage aids are also preferably stackable. This has the advantage that the storage aids may be stored in a space-saving manner. Furthermore, the storage aids may be stored directly in the storage system in a space-saving manner due to the stackability thereof. The engagement means of a bottom storage aid are set to the locking state, which holds them in a storage position. Further storage aids are then placed or stacked, respectively, on this bottom storage aid, with the engagement means of these further storage aids remaining in the release state. When the stacked storage aids are removed, they are removed from the stack one after the other from above.

The method according to the invention for storing objects in the storage system according to the invention comprises the steps of:

determining a first storage height of a first object to be stored in the storage system;

introducing or applying the first object into or onto a first storage aid selected from the storage aids of the storage system;

connecting the first storage aid to the storage operating vehicle;

introducing the first storage aid into a first storage position in the storage volume by the storage operating vehicle, while the engagement means of the first storage aid are in the release state;

moving the engagement means of the first storage aid from the release state into the locking state in order to fix the first storage aid in the first storage position;

uncoupling the first storage aid from the storage operating vehicle;

connecting a second storage aid selected from the storage aids of the storage system to the storage operating vehicle;

introducing the second storage aid into a second storage position in the storage volume by the storage operating vehicle, while the engagement means of the storage aid are in the release state, wherein the second storage position is located at a vertical distance of at least the first storage height above the first storage position;

moving the engagement means of the second storage aid from the release state into the locking state in order to fix the second storage aid in the second storage position;

uncoupling the second storage aid from the storage operating vehicle.

Determining the first storage height of the first object and selecting the second storage position at a vertical distance of at least the first storage height above the first storage position allows the distance of the first storage position from the second storage position to be varied based on the space required by the object to be stored in the first storage position.

According to the preferred embodiment of the method according to the invention, the space required by a fire extinguishing or fire suppression agent is taken into account in the vertical distance between the first storage position and the second storage position. This makes it possible to automatically take into account the space required for different fire extinguishing or fire suppression agents between the storage positions in order to ensure a sufficient supply of fire extinguishing agent and a sufficient distribution of the fire extinguishing agent in the storage system in the event of a fire.

Moving at least one of the engagement means of the storage aids of the storage system between the locking state and the release state is preferably carried out by rotating the engagement means in a rotation axis arranged essentially along a course of the shelf supports. This achieves the advantage that the movement between the release state and the locking state may be carried out in a mechanically simple manner starting from the operating level.

Preferably, at least one of the engagement means of the storage aids of the storage system is moved from the locking state to the release state by lifting the storage aid from the first storage position or the second storage position. This simplifies the procedure when removing the respective storage aid from the storage position, since no separate method step is necessary for moving the engagement means from the locking state to the release state.

The first object may be a storage aid, a stack of storage aids or an article. In this way, it is made possible to store storage aids in the storage system and to remove them again when required. In this way, the space required to keep storage aids ready will be greatly reduced.

Preferably, the method according to the invention comprises the additional steps:

determining a second storage height of a second object to be stored in the storage system;

introducing or applying the second object into or onto the second storage aid.

In this way, a second object to be stored is stored in the storage system and its second storage height is being determined. This makes it possible to take into account the space requirements of each object stored in the storage system.

BRIEF DESCRIPTION OF THE DRAWINGS

The storage system according to the invention and the method according to the invention for storing objects in a storage system are explained in more detail below by way of the figures.

DETAILED DESCRIPTION

Figure 1:
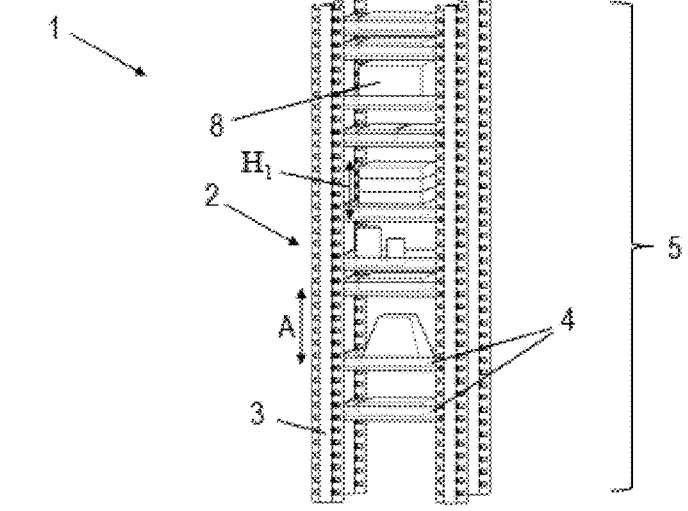
FIG. 1 shows a storage system according to the invention with several objects of different dimensions stored on storage aids.
Figure 2:
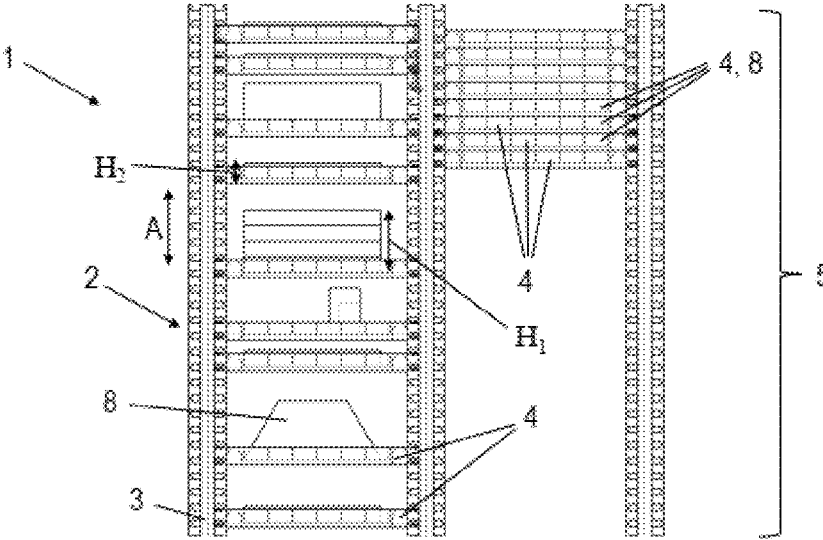
FIG. 2 shows the storage system according to the invention according to FIG. 1 with a stack of additionally stored storage aids.
Figures 3A, 3B, 3C, 4A, 4B, 4C:
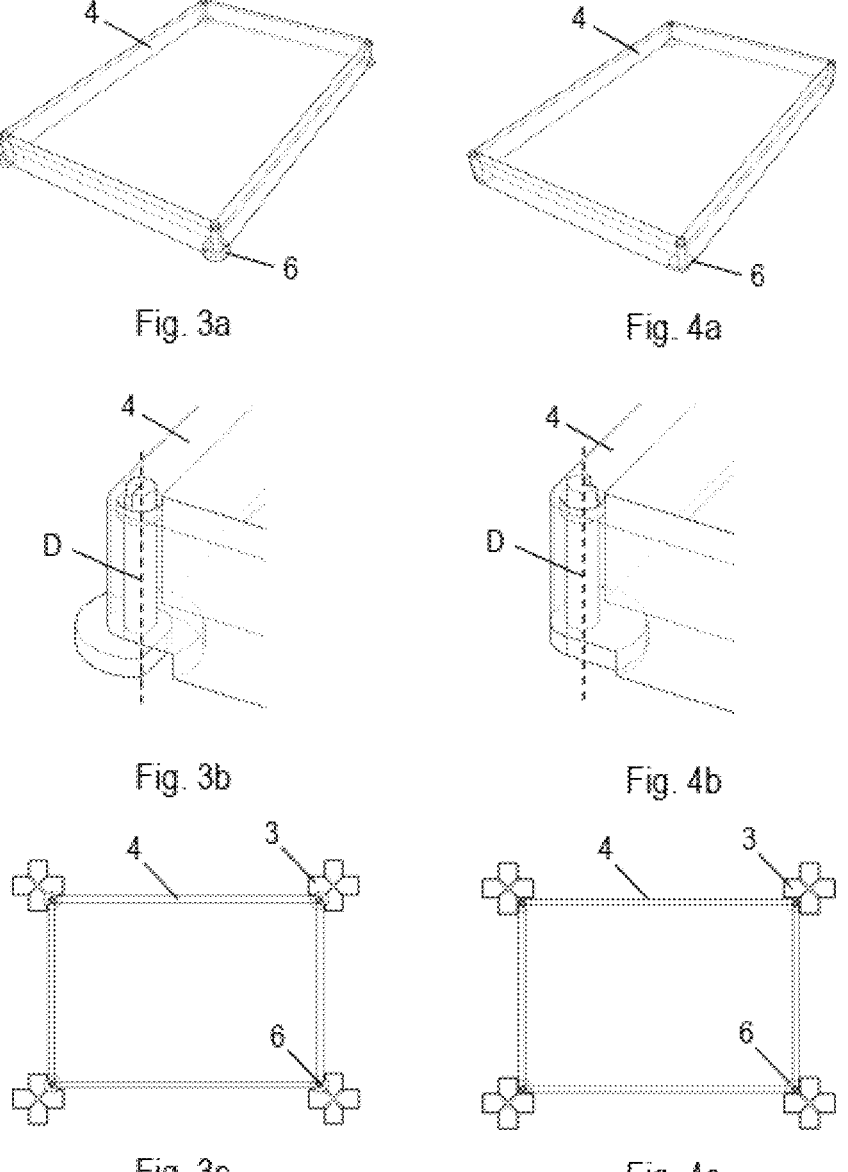
FIG. 3a shows a storage aid of the storage system according to the invention with engagement means, which are in a locking state.
FIG. 3b shows an engagement means of the storage aid according to FIG. 3a in detail.
FIG. 3c shows the storage aid from FIG. 3a in a top view.
FIG. 4a shows a storage aid of the storage system according to the invention with engagement means, which are in a release state.
FIG. 4b shows an engagement means of the storage aid according to FIG. 4a in detail.
FIG. 4c shows the storage aid from FIG. 4a in a top view.
Figure 3D:
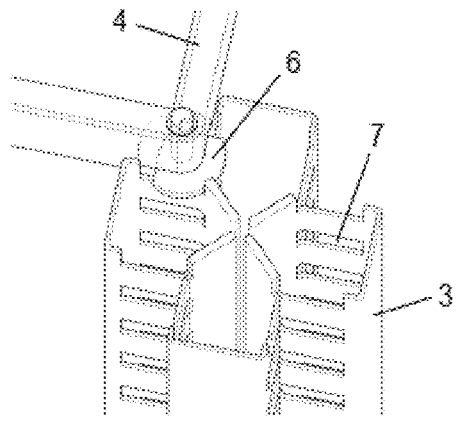
FIG. 3d shows an engagement means of the storage aid according to FIG. 3a, which engages with a receiving means of a shelf support of the storage system.
Figure 4D:
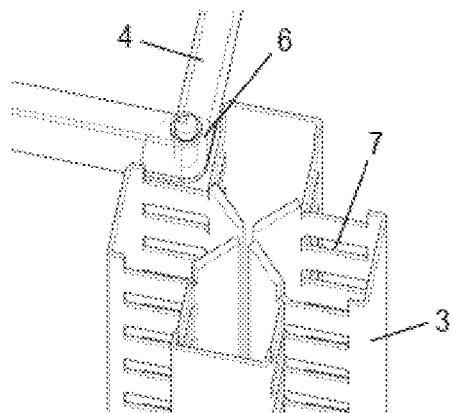
FIG. 4d shows an engagement means of the storage aid according to FIG. 4a, which is released from a receiving means of a shelf support of the storage system.

The storage system 1 according to the invention is shown in sections in an external view in FIG. 1 and FIG. 2. The storage system 1 comprises at least one shelf 2 having several shelf supports 3 set up on a base and extending essentially vertically, or at least in sections. In addition, the storage system 1 comprises at least one storage operating vehicle, which is not depicted in the figures, and at least two storage aids 4. Furthermore, the storage system 1 comprises an operating level arranged at an upper end of the shelf 2 and a storage volume 5 arranged below the operating level. The storage operating vehicle is arranged so that it may move in the operating level and is configured to introduce the storage aids 4 into the storage volume 5 and to retrieve them from it. According to the invention, each of the storage aids 4 has engagement means 6, and the shelf supports 3 have receiving means 7 arranged in the storage volume 5. The engagement means 6 are shown in detail in the FIGS. 3b and 4b, for example, with the FIGS. 3d and 4d also showing the receiving means 7. The engagement means 6 may be moved between a locking state, in which the engagement means are essentially fixed in at least some of the receiving means 7 and hold the respective storage aid 4 in a storage position in the storage volume 5, and a release state, in which the engagement means 6 are released from the receiving means 7. FIGS. 3a to 3d show the engagement means 6 in the locking state and the FIGS. 4a to 4d show the engagement means 6 in the release state. The storage operating vehicle is configured to move the engagement means 6 between the locking state and the release state starting from the operating level. Due to the possibility of moving the engagement means 6 between the release state and the locking state starting from the operating level, the storage aid 4 may be fastened in different storage positions within the storage volume 5, whereby a distance A between two storage aids 4 that are vertically consecutive in a shelf 2 may be adapted to the space requirements of the respective object 8 stored on the storage aid 4. In this way, space utilization within the storage system 1 will be substantially improved.

Figure 6A:
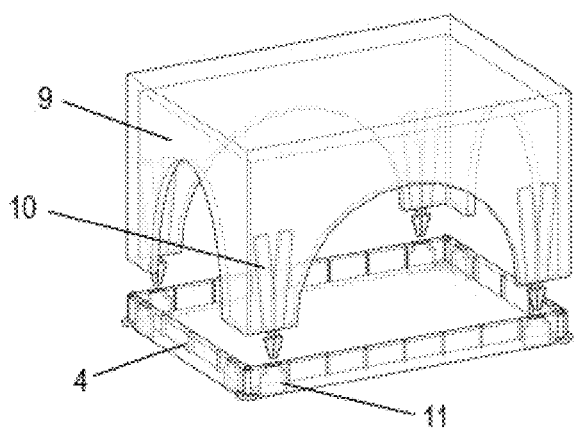
FIG. 6a shows a load-receiving means of the storage system according to the invention before coupling with a storage aid.
Figure 6B:
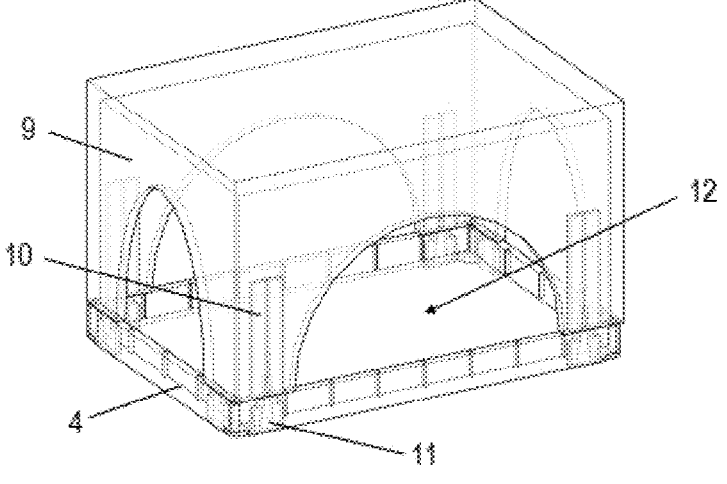
FIG. 6b shows the load-receiving means according to FIG. 6a in a state coupled with the storage aid.
Figure 6C:
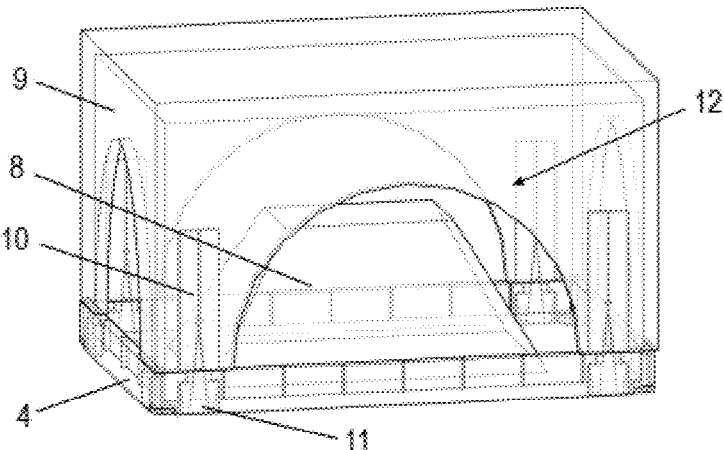
FIG. 6c shows the load-receiving means according to FIG. 6b, wherein there is additionally shown an object, which is received by the load-receiving means.

According to the preferred embodiment of the storage system 1 according to the invention, the storage operating vehicle has a load-receiving means 9, which may be moved essentially vertically in the storage volume 5 and may be coupled to one of the storage aids 4 for introducing and removing the storage aid 4 from the storage volume 5. Such a load-receiving means 9 is shown in the FIGS. 6a to 6c. This load-receiving means 9 is lowered into the storage volume 5 from the operating level by the storage operating vehicle (not shown). In this case, either a storage aid 4 is already coupled to the load-receiving means 9, as can be seen in the FIGS. 6b and 6c, or the load-receiving means 9 is not yet occupied and is only coupled to a storage aid 4 located there upon reaching a storage position. For example, the storage operating vehicle may lower the load-receiving means 9 into the storage volume 5 using a cable pull (not shown in the figures). This has the advantage that the storage operating vehicle itself need not enter the storage volume 5, and the storage aid 4 may be quickly introduced into and removed from the storage volume 5. As can be seen in the FIGS. 6a to 6c, the load-receiving means 9 may be coupled to the storage aid 4 by a retaining means 10, for example in the form of scissors, wherein the retaining device 10 engages with corresponding recesses or slots 11 in the storage aid 4 as the load-receiving means 9 is lowered onto the storage aid 4. In this way, the load-receiving means 9 is automatically coupled to the storage aid 4 as soon as the load-receiving means 9 has been lowered onto the storage aid 4. The load-receiving means 9 is preferably configured to move the engagement means 6, preferably during the coupling with the storage aid 4, from the locking state to the release state and/or preferably during the decoupling from the storage aid 4 from the release state to the locking state. This may be achieved, for example, by means of a mechanical folding mechanism or rotating mechanism, which is not shown separately in the figures. This prevents the engagement means 6 of the load-receiving means 4 from remaining in the locking state as soon as a coupling with the load-receiving means 9 has taken place. As can be seen in FIG. 6c, the load-receiving means 9 may have a receiving space 12, which is adapted to a maximum dimension of the storage operating vehicle. Alternatively, the load-receiving means 9 may also be configured to be open at the top, such that a height of the object 8 stored or to be stored on the load-receiving means 9 will not be limited.

Figure 5:
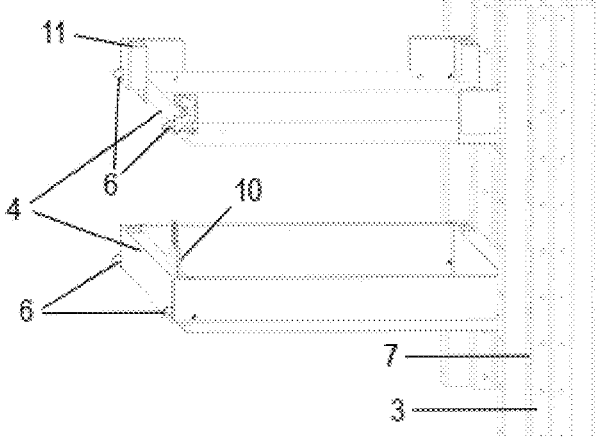
FIG. 5 shows a storage aid of the storage system according to the invention in an alternative embodiment variant in a partial sectional view and in an external view.

The receiving means 7 of the shelf supports 3, with which the engagement means 6 of the storage aid 4 engage in the locking state, are preferably configured as recesses, depressions or seams provided in the shelf supports 3. For example, in the FIGS. 3d and 4d, an embodiment variant is shown, in which the receiving means 7 are configured as slots. This simplifies the manufacture of the shelf supports 3, whereby the overall costs of the storage system 1 may be kept low. The engagement means 6 may, in turn, be configured as hooks, bolts or segment discs arranged on a shaft, for example. In the embodiment variant of the storage system 1 according to the invention shown in the FIGS. 3a to 4d, the engagement means 6 are configured as segment discs. This enables a particularly resilient, but also easily manipulated construction of the engagement means 6 and the receiving means 7. In addition, the engagement means 6 may preferably be pre-tensioned in the locking state and/or the release state by means of a spring (not shown in the figures). In this way, the risk of incorrect operation may be prevented. In FIG. 5 there is shown an alternative embodiment variant of the engagement means 6, in which the engagement means 6 are configured as hooks. For example, in this embodiment variant, the engagement means 6 may be released from the locking state by simply lifting the storage aid 4. The hooks then retract into a space in the storage aid 3.

In the storage system 1 according to the invention, the engagement means 6 of one of the storage aids 4 in the locking state preferably engage with receiving means 7 of several shelf supports 3 that are located opposite one another in a level. As can be seen in the figures, there may be provided storage aids 4 having a square base, for example, wherein there is provided an engagement means 6 in each corner. This will achieve a particularly stable fastening of the storage aid 4 in the locking state and will ensure a high load-bearing capacity.

The storage aids 4 are preferably stackable. In FIG. 2 there is, for example, shown how several storage aids 4 may be stored one on top of the other in a storage position in the storage volume 5. These stacked storage aids 4 thus form an object 8, which is stored in the storage system 1 on a bottom storage aid 4. In this case, only the engagement means 6 of the bottom storage aid 4 are set to the locking state, and the other storage aids 4 forming the object 8 are placed on this bottom storage aid 4. The engagement means 6 of the other storage aids 4 are in the release state. The storage aids 4 may be removed from this stack again by removing the storage aids 4 one after the other from the top of the stack, for example by means of the load-receiving means 9, starting with the storage aid 4 closest to the operating level. This will significantly reduce the space required for storing the storage aids 4.

The method according to the invention for storing objects 8 in the storage system 1 according to the invention comprises determining a first storage height $H_1$ of a first object 8 to be stored in the storage system. In this way, the space requirement of this first object 8 will be determined. The determination may be made, for example, by means of a measurement, or may also be stored in a database. Furthermore, the first object 8 is applied to or introduced, respectively, onto or into a first storage aid 4 selected from the storage aids 4 of the storage system 1. In addition, the first storage aid 4 is connected to the storage operating vehicle and introduced by it into a first storage position in the storage volume 5, while the engagement means 6 of the first storage aid 4 are in the release state. If the first storage aid 4 is in the first storage position, the engagement means 6 of the first storage aid 4 are moved from the release state to the locking state in order to fix the first storage aid 4 in the first storage position. After that, or at the same time, the first storage aid 4 is uncoupled from the storage operating vehicle. Subsequently, a second storage aid 4 selected from the storage aids 4 of the storage system is coupled to the storage operating vehicle and introduced into a second storage position in the storage volume 5 by the storage operating vehicle, while the engagement means 6 of the second storage aid 4 are in the release state. The second storage position is located at a vertical distance A from at least the first storage height $H_1$ above the first storage position. This will achieve the advantage that the distance A of the first storage position and the second storage position is selected based on the space requirement of the first object 8. This enables the storage positions to be adapted to the actual space requirement of the objects 8 to be stored in the storage system 1 according to the invention. In this way, empty spaces in the storage volume 5 will be reduced. Subsequently, the engagement means 6 of the second storage aid 4 are moved from the release state to the locking state in order to fix the second storage aid in the second storage position, and the second storage aid 4 is uncoupled from the storage operating vehicle.

Preferably, according to the method according to the invention, the space requirement of a fire extinguishing or fire suppression agent (not shown in the figures) is taken into account in the vertical distance A between the first storage position and the second storage position. This will ensure that in the event of a fire, sufficient fire extinguishing or fire suppression agent may be introduced into the storage volume 5 and that this may reach all objects 8 stored.

Moving at least one of the engagement means of the storage aids of the storage system 1 between the locking state and the release state is preferably carried out by rotating the engagement means 6 in a rotation axis D arranged essentially along a course of the shelf supports 3. This ensures that the engagement means 6 may be easily operated. The rotation axis D may be seen in the FIGS. 3*b* and 4*b*. For rotating purposes, for example, as shown in these figures, there may be provided an axis connected to the engagement means 5 in the form of a segment disk, which axis comprises a coupling element at an end opposite to the segment disk.

Moving at least one of the engagement means 6 of the storage aids 4 of the storage system 1 from the locking state to the release state may also be carried out by lifting the storage aid 4 from the first storage position or the second storage position. This will reduce the probability that one of the storage aids 4 gets stuck in the respective storage position, and will reduce the susceptibility to errors of the method according to the invention. The first object 8 may be a storage aid 4, as can be seen in FIG. 2, a stack of storage aids 4 or an article. In general, the first object 8 may be an article or any object 8 that is stored in and/or retrieved from the storage system 1 using the method according to the invention.

Preferably, in the method according to the invention, a second storage height $H_2$ of a second object 8 to be stored in the storage system is determined, and the second object 7 is introduced or applied into or onto the second storage aid 4. In this way, the storage height of each object 8 stored using the method according to the invention is determined. Like the first object 8, the second object 8 may also be a storage aid 4, a stack of storage aids 4 or an article. In general, the second object 8 may be an article or any object 8 that is stored in and/or retrieved from the storage system 1 using the method according to the invention.

The invention claimed is:

1. A storage system comprising:

at least one shelf having several essentially vertically extending shelf supports set up on a base;

at least one storage operating vehicle;

at least two storage aids;

an operating level arranged at an upper end of the at least one shelf; and a storage volume arranged below the operating level, wherein the at least one storage operating vehicle is configured to move in the operating level and is configured to introduce the at least two storage aids into the storage volume and to retrieve the at least two storage aids from the storage volume, wherein each of the storage aids includes an engagement means, and the shelf supports include receiving means arranged in the storage volume, wherein the engagement means may be moved between a locking state, in which the engagement means are substantially fixed in at least some of the receiving means and hold the respective storage aid in a storage position in the storage volume, and a release state, in which the engagement means are released from the receiving means, wherein the storage operating vehicle is configured to move the engagement means between the locking state and the release state starting from the operating level, wherein the storage operating vehicle has a load-receiving means, which may be moved essentially vertically in the storage volume and may be coupled to one of the storage aids for introducing and retrieving the storage aid from the storage volume, and wherein the load-receiving means is configured to move the engagement means, in a course of coupling with the storage aid, from the locking state into the release state and/or in a course of decoupling from the storage aid from the release state to the locking state.

2. The storage system according to claim 1, wherein the receiving means are configured as recesses, depressions or seams provided in the shelf supports.

3. The storage system according to claim 1, wherein the engagement means are configured as hooks, bolts or segment discs arranged on a shaft, and are prestressed by means of a spring in the locking state and/or the release state.

4. The storage system according to claim 1, wherein the engagement means of one of the storage aids in the locking state engage with receiving means of several shelf supports located opposite one another in a level.

5. The storage system according to claim 1, wherein the storage aids are stackable.

6. A method for storing objects in the storage system according to claim 1, comprising steps of:

determining a first storage height ($H_1$) of a first object to be stored in the storage system;

introducing or applying the first object into or onto a first storage aid selected from the storage aids of the storage system;

connecting the first storage aid to the storage operating vehicle;

introducing the first storage aid into a first storage position in the storage volume by the storage operating vehicle, while the engagement means of the first storage aid are in the release state;

moving the engagement means of the first storage aid from the release state into the locking state in order to fix the first storage aid in the first storage position upon decoupling the first storage aid from the storage operating vehicle;

connecting a second storage aid selected from the storage aids of the storage system to the storage operating vehicle;

introducing the second storage aid into a second storage position in the storage volume by the storage operating vehicle, while the engagement means of the storage aid are in the release state, wherein the second storage position is located at a vertical distance (A) of at least the first storage height ($H_1$) above the first storage position;

moving the engagement means of the second storage aid from the release state into the locking state in order to fix the second storage aid in the second storage position upon uncoupling the second storage aid from the storage operating vehicle.

7. The method according to claim 6, wherein a space requirement of a fire extinguishing or fire suppression means is taken into account in the vertical distance (A) between the first storage position and the second storage position.

8. The method according to claim 6, wherein the moving of at least one of the engagement means of the storage aids of the storage system between the locking state and the release state is realized by rotating the engagement means in an axis of rotation (D) arranged substantially along a course of the shelf supports.

9. The method according to claim 6, wherein the moving of at least one of the engagement means of the storage aids of the storage system from the locking state into the release state is realized by lifting the storage aid from the first storage position or the second storage position.

10. The method according to claim 6, wherein the first object is a storage aid, a stack of storage aids or an article.

11. The method according to claim 6, wherein the steps of:

determining a second storage height ($H_2$) of a second object to be stored in the storage system;

introducing or applying the second object into or onto the second storage aid.

\*　\*　\*　\*　\*